United States Patent Office 3,248,422
Patented Apr. 26, 1966

3,248,422
HALOGENATED NAPHTHOIC ACIDS
Edward Faith Elslager and Donald Francis Worth, Ann Arbor, Mich., assignors to Parke, Davis & Company, Detroit, Mich., a corporation of Michigan
No Drawing. Filed July 9, 1963, Ser. No. 293,902
Claims priority, application Great Britain, Apr. 18, 1963, 15,411/63, 15,412/63
6 Claims. (Cl. 260—520)

This application is a continuation-in-part of copending application Serial No. 188,984, filed April 20, 1962, now U.S. Patent 3,161,641, and of copending application Serial No. 188,985, filed April 20, 1962, now U.S. Patent 3,223,705.

The present invention relates to a novel class of naphthoic acids, to salts thereof and to methods for their production. More particularly, it relates to 7-bromo-3-hydroxy-2-naphthoic acids that in the free acid form have the formula

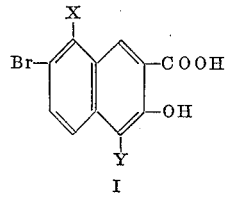

I where X represents a hydrogen atom or a bromine atom, and Y represents a 4'-(7'-bromo-3'-hydroxy-2'-naphthoic acid), 4'-(7',8'-dibromo-3'-hydroxy-2'-naphthoic acid), 4'-methylene(3'-hydroxy-2'-naphthoic acid), 4'-methylene-1'-hydroxy-2'-naphthoic acid), 5'-methylene(6'-hydroxy-2'-naphthoic acid), 4'-methylene(7'-bromo-3'-hydroxy-2'-naphthoic acid), 4'-methylene(7',8'-dibromo-3'-hydroxy-2'-naphthoic acid), 4'-benzylidene(3'-hydroxy-2'-naphthoic acid), 4'-benzylidene(1'-hydroxy-2'-naphthoic acid), 5'-benzylidene(6'-hydroxy-2'-naphthoic acid), 4'-benzylidene(7'-bromo-3'-hydroxy-2'-naphthoic acid), 4'-benzylidene(7',8'-dibromo-3'-hydroxy-2'-naphthoic acid), or 3-carboxy-4-hydroxybenzyl radical.

In accordance with the invention, 7-bromo-3-hydroxy-2-naphthoic acids of Formula I wherein Y represents a 4'-(7'-bromo-3'-hydroxy-2'-naphthoic acid) or a 4'-(7',8'-dibromo-3'-hydroxy-2'-naphthoic acid) radical are prepared by the reaction of two equivalents of a 7-bromo-3-hydroxy-2-naphthoic acid of the formula

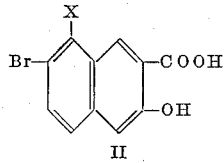

II in the presence of an oxidizing agent, such as ferric chloride; where X has the aforementioned significance. This coupling reaction is preferably carried out in a solvent medium. Suitable solvents for this purpose include water and aqueous mixtures of water-miscible solvents such as methanol, ethanol, proponal, dimethylformamide, dimethylacetamide, and the like. The time and temperature of the reaction are not critical; however, temperatures of 80° C. to 120° C. for a period of 30–60 minutes are usually preferred.

Also in accordance with the invention, 7-bromo-3-hydroxy-2-naphthoic acids of Formula I wherein Y represents a 4'-methylene(7'-bromo-3'-hydroxy-2'-naphthoic acid), 4'-methylene(7',8'-dibromo-3'-hydroxy-2'-naphthoic acid), 4'-benzylidene(7'-bromo-3'-hydroxy-2'-naphthoic acid), or 4'-benzylidene(7',8'-dibromo-3'-hydroxy-2'-naphthoic acid) radical are prepared by the condensation of a 7-bromo-3-hydroxy-2-naphthoic acid of Formula II with benzaldehyde, formaldehyde, or a formaldehyde-generating agent such as paraformaldehyde. The condensation reaction is preferably conducted under basic condition (pH >7), although, if desired, neutral or acidic conditions can be employed. Under basic conditions, an alkali metal hydroxide such as sodium hydroxide or potassium hydroxide, an alkaline earth hydroxide, or ammonium hydroxide is commonly used; under acidic conditions, a mixture of acetic acid and hydrochloric acid is usually employed. In carrying out the reaction it is generally satisfactory to employ substantially equivalent quantities of the reactants in the presence of a suitable solvent, although an excess of the aldehyde or aldehyde-generating agent is usually preferred. Suitable solvents for the reaction are water and aqueous mixtures of water-miscible solvents such as methanol, ethanol, propanol, tetrahydrofuran, N,N-dimethylacetamide, N,N-dimethylformamide, and the like. In general, the time and the temperature of the reaction are not critical; however, a temperature of 80° C. to 120° C. is usually preferred. Compounds of the formula

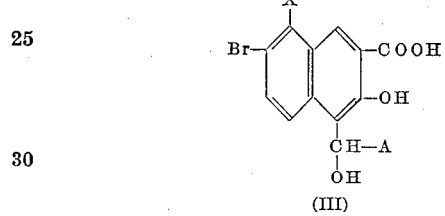

(III)

where X has the aforementioned significance and A is hydrogen or phenyl, are believed to be formed as intermediates in the condensation but are not isolated.

In accordance with yet another process, the 7-bromo-3-hydroxy-2-naphthoic acid compounds of the invention are prepared by the hydrolysis of 7-bromo-3-hydroxy-2-naphthoic acid esters of the formula

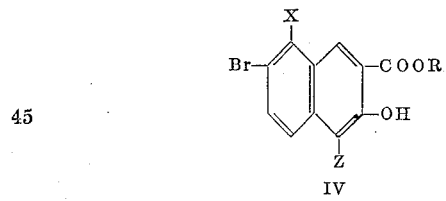

IV where X has the aforementioned significance, R is lower alkyl and Z represents a naphthoic acid radical as previously defined by Y or a lower alkyl ester derivative thereof. The hydrolysis is preferably conducted under basic conditions (pH >7) because of solubility advantages, although, if desired, acidic conditions can be employed. Alkali metal hydroxides such as sodium hydroxide or potassium hydroxide are usually preferred. In carrying out the hydrolysis an excess of the base or acid is normally used. When basic hydrolysis is used, the product is isolated either as the alkali metal salt or by acidification of the reaction mixture followed by filtration. The hydrolysis reaction can be carried out in an excess of the appropriate acid or base or in a suitable solvent medium. Some suitable solvents for this purpose are water and aqueous mixtures of water-miscible solvents such as methanol, ethanol, propanol, acetone, tetrahydrofuran, dimethylsulfoxide and the like. The time and temperature of the reaction are not critical; however, temperatures of 80° C. to 120° C. are usually preferred.

The 7-bromo-3-hydroxy-2-naphthoic acid esters of Formula IV, utilized as intermediates in the above process, can be prepared in a number of ways. Some of the esters can be prepared by the reaction of a 7-bromo-3-hydroxy-2-naphthoic acid ester of the formula

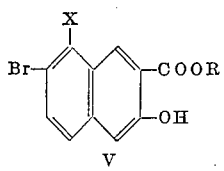

V with an oxidizing agent, such as ferric chloride, either alone to prepare the dicarboxylic acid ester, or in the presence of an equivalent amount of an acid of Formula II to prepare the mono-acid, monoester; where X and R have the previously defined significance. Other esters of Formula IV can be prepared by the reaction of the esters of Formula V with the appropriate aldehyde or aldehyde-generating agent or by the condensation of a 7-bromo-4-chloromethyl-3-hydroxy-2-naphthoic acid ester of the formula

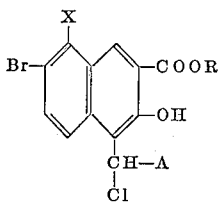

VI with 7-bromo-3-hydroxy-2-naphthoic acid, 3-hydroxy-2-naphthoic acid, 1-hydroxy-2-naphthoic acid, 6-hydroxy-2-naphthoic acid, 7,8-dibromo-3-hydroxy-2-naphthoic acid, salicylic acid, or lower alkyl esters thereof; where A, X, and R have the aforementioned significance. The latter reaction is generally carried out in a solvent medium such as acetic acid at 80° C. to 100° C. The intermediate 7-bromo-4-chloromethyl-3-hydroxy-2-naphthoic acid esters of Formula VI are readily prepared from the appropriate aldehyde and hydrochloric acid.

The 7-bromo-3-hydroxy-2-naphthoic acids of Formula I and their soluble salts are valuable chemical intermediates for use in the preparation of other chemical compounds that possess antiparasitic and chemotherapeutic properties. For example, the compounds can be used to form salts with 4,6-diamino-1,2-dihydro-2-lower alkyl-1-aryl-s-triazines and with pyrimethamine as described in copending applications 188,985 and 188,984, respectively; these salts exhibit various advantages, including an unusually long duration of biological action and lack of irritation at the site of injection when used parenterally. Further, the compounds of the present invention form insoluble, high-melting salts with water-soluble amines which permit facile identification and recovery of these amines from aqueous solutions in essentially quantitative yield.

In alkali metal salt form, the compounds of the invention are useful as thickening agents. When used as thickening agents, they exhibit good adhesive power, high viscosity in dilute solutions, strong hydrophilic character, and are relatively nontoxic. As a specific illustration of their use, the incorporation of the disodium salt of 4,4'-methylenebis(7,8-dibromo-3-hydroxy-2-naphthoic acid) in aqueous solution to the extent of 1 to 2% allows the formation of gels upon the addition of the requisite amount of an agent, such as sodium hydroxide, potassium hydroxide, or sodium chloride. Such gels can then be incorporated into pharmaceutical compositions and various other types of formulations.

The compounds of the invention are also useful for the assay of solutions containing metal ions such as silver, copper, iron or barium, and for the removal and recovery of these metals from their aqueous solutions. For example, upon treatment of an aqueous iron solution with the disodium salt of 4,4'-methylenebis(7,8-dibromo-3-hydroxy-2-naphthoic acid), a sparingly soluble precipitate, which can be collected by filtration and dried, is formed. Decomposition of this complex with concentrated hydrochloric acid allows recovery of the 4,4'-methylenebis(7,8-dibromo-3-hydroxy-2-naphthoic acid) by filtration and the ferric chloride upon concentration of the filtrate.

The invention is illustrated by the following examples.

*Example 1*

To a solution of 4.4 g. of sodium hydroxide and 29.4 g. of 7-bromo-3-hydroxy-2-naphthoic acid in 850 ml. of boiling water is added dropwise a solution of 33 g. of ferric chloride hexahydrate in 70 ml. of water. The reaction mixture is stirred and heated under reflux for 30 minutes, filtered, and the precipitate stirred with 2 l. of 18% hydrochloric acid on the steam bath for 1 hour. The solid 6,6'-dibromo-2,2'-dihydroxy-(1,1'-binaphthalene)-3,3'-dicarboxylic acid obtained is collected by filtration, washed thoroughly with water, dried in vacuo at 45° C., and crystallized from an ethanol-water mixture; yellow crystals, M.P. 357° C. (dec.).

In like manner, 5,5',6,6'-tetrabromo-2,2'-dihydroxy-(1,1'-binaphthalene)-3,3'-dicarboxylic acid, M.P. >330° C., can be prepared from 7,8-dibromo-3-hydroxy-2-naphthoic acid and ferric chloride.

*Example 2*

A mixture of 26.7 g. of 7-bromo-3-hydroxy-2-naphthoic acid, 6.0 g. of sodium hydroxide and 700 ml. of water is heated to 90° C. on the steam bath and 6.0 ml. of 40% formaldehyde solution is added. The resulting light brown solution is stirred and heated on the steam bath for 2 hours and cooled. The precipitate is collected by filtration, dissolved in hot water, the aqueous solution is filtered, and the filtrate is acidified with hydrochloric acid. The precipitated 4,4'-methylenebis-(7-bromo-3-hydroxy-2-naphthoic acid) is collected by filtration and dried in vacuo at 65° C.; M.P. 330–335° C. (dec.).

Alternatively, 4,4'-methylenebis(7-bromo-3-hydroxy-2-naphthoic acid) can be prepared as follows: To a solution of 26.7 g. of 7-bromo-3-hydroxy-2-naphthoic acid in hot glacial acetic acid there is added slowly 7.5 ml. formalin followed by 5 ml. of concentrated hydrochloric acid. The mixture is heated and stirred on the steam bath for 2 hours, cooled to room temperature, and the desired methylenebis(7-bromo-3-hydroxy-2-naphthoic acid) is collected by filtration.

The desired 4,4'-methylenebis(7-bromo-3-hydroxy-2-naphthoic acid) can also be prepared from the corresponding dimethyl ester according to the following procedure: A slurry of 57.8 g. 4,4'-methylenebis(7-bromo-3-hydroxy-2-naphthoic acid methyl ester) in 1000 ml. of 50% methanol containing 40 g. of sodium hydroxide is heated and stirred under reflux for 8 hours. After cooling, the mixture is treated with excess hydrochloric acid and the 4,4'-methylenebis(7-bromo-3-hydroxy-2-napthoic acid) which precipitates is collected by filtration and dried in vacuo.

The required 4,4'-methylenebis(7-bromo-3-hydroxy-2-naphthoic acid methyl ester) is readily prepared from 7-bromo-3-hydroxy-2-naphthoic acid methyl ester and formalin in acetic acid solution in the presence of hydrochloric acid according to the procedure given above for the preparation of 4,4'-methylenebis(7-bromo-3-hydroxy-2-naphthoic acid).

*Example 3*

A slurry of 11.15 g. of 4-(chloromethyl)-3-hydroxy-2-naphthoic acid methyl ester and 11.85 g. of 7-bromo-3-hydroxy-2-naphthoic acid in 1000 ml. of glacial acetic acid is heated on the steam bath for 6 hours. The yellow precipitate of 7-bromo-4,4'-methylenebis(3-hydroxy-2-naphthoic acid), monomethyl ester that separates is collected by filtration, dried, and crystallized from dimethylacetamide, washed with hot water, and dried in vacuo at 75° C.; M.P. 282° C. (dec.).

The methyl ester prepared above (9.1 g.) is dissolved in 200 ml. of 1 N sodium hydroxide solution, and the solution is heated on the steam bath for 3 hours and filtered. The filtrate is poured into an excess of dilute hydrochloric acid and the mixture is heated to coagulate the precipitated 7-bromo-4,4'-methylenebis(3-hydroxy-2-naphthoic acid). The product is collected by filtration, washed thoroughly with water, dried, and crystallized from dimethylacetamide-water; yellow crystals, M.P. 316–318° C. (dec.).

Alternatively, 7-bromo-4,4'-methylenebis(3-hydroxy-2-naphthoic acid) can be prepared as follows: A mixture of 28.1 g. of 7-bromo-3-hydroxy-2-naphthoic acid, methyl ester, 25 ml. of formalin and 200 ml. of concentrated hydrochloride acid is allowed to stand at room temperature for 2 days with occasional shaking. The precipitate is collected by filtration, dried in vacuo at 45° C. and crystallized from ethyl acetate. This product, M.P. 191–200° C., is the intermediate 7-bromo-4-(chloromethyl)-3-hydroxy-2-naphthoic acid, methyl ester, which is subsequently allowed to react with 3-hydroxy-2-naphthoic acid and the resulting ester hydrolyzed according to the procedure described above.

In like manner, the following related compounds can be prepared starting from the appropriately substituted hydroxynaphthoic acids:

7-bromo-3,1'-dihydroxy-4,4'-methylenedi-2-naphthoic acid 7-bromo-3,6'-dihydroxy-4,5'-methylenedi-2-naphthoic acid 7-bromo-4-(3-carboxy-4-hydroxybenzyl)-3-hydroxy-2-naphthoic acid, M.P. >300° C.

*Example 4*

A solution of 63 g. of 7,8-dibromo-3-hydroxy-2-naphthoic acid, 11.0 g. of sodium hydroxide and 10.2 ml. of formalin in 2500 ml. of water is stirred and heated on the steam bath for 3.5 hours. The reaction mixture is treated with excess hydrochloric acid and the precipitated 4,4'-methylenebis(7,8-dibromo-3-hydroxy-2-naphthoic acid) is collected by filtration, washed with water, dried in vacuo at 75° C., and crystallized from dimethylformamide; bright yellow crystals, M.P. >330° C.

*Example 5*

A mixture of 40.8 g. of 7,8-dibromo-4-(chloromethyl)-3-hydroxy-2-naphthoic acid methyl ester and 26.7 g. of 7-bromo-3-hydroxy-2-naphthoic acid are allowed to react utilizing the procedure described under Example 3 herein. The intermediate 7,7',8-tribromo-4,4'-methylenebis(3-hydroxy-2-naphthoic acid) methyl ester is hydrolyzed with aqueous sodium hydroxide solution to give the desired 7,7',8-tribromo-4,4'-methylenebis(3-hydroxy-2-naphthoic acid); yellow crystals, M.P. >330° C.

In like manner the following related acids can be prepared from 7,8-dibromo-4-(chloromethyl)-3-hydroxy-2-naphthoic acid methyl ester and the appropriate acid:

7,8-dibromo-4-(3-carboxy-4-hydroxybenzyl)-3-hydroxy-2-naphthoic acid; M.P. >300° C.

7,8-dibromo-4,4'-methylenebis(3-hydroxy-2-naphthoic acid); M.P. >300° C.

7,8-dibromo-3,6'-dihydroxy-4,5'-methylenedi-2-naphthoic acid; M.P. >300° C.

7,8-dibromo-3,1'-dihydroxy-4,4'-methylenedi-2-naphthoic acid; M.P. >300° C.

*Example 6*

An intimate mixture of 28.1 g. of 7-bromo-3-hydroxy-2-naphthoic acid methyl ester and 40.6 g. of 7-bromo-4-(α-chlorobenzyl)-3-hydroxy-2-naphthoic acid methyl ester is heated slowly to 150° C. with occasional stirring. After maintaining the temperature at 140–150° C. for 1 hour, the melt is cooled to room temperature and the crude 4,4'-benzylidenebis(7-bromo-3-hydroxy-2-naphthoic acid methyl ester) is treated with a methanol-sodium hydroxide mixture in the manner described under Example 2 for the hydrolysis of 4,4'-methylenebis(7-bromo-3-hydroxy-2-naphthoic acid methyl ester). Recrystallization from a mixture of dimethylformamide and water gives the desired 4,4'-benzylidenebis-(7-bromo-3-hydroxy-2-naphthoic acid) as a yellow powder; M.P. >330° C.

The required 7-bromo-4-(α-chlorobenzyl)-3-hydroxy-2-naphthoic acid methyl ester may be prepared in the following manner: A solution of 28.1 g. of 7-bromo-3-hydroxy-2-naphthoic acid methyl ester in excess benzaldehyde is treated with 10 g. of anhydrous hydrogen chloride while the temperature is held below 20° C. with external cooling. The reaction mixture is then allowed to stand at room temperature for 1 week, when the precipitate which forms is collected by filtration and washed well with benzene. This crude 7-bromo-4-(α-chlorobenzyl)-3-hydroxy-2-naphthoic acid methyl ester is used without further purification.

Alternatively, the benzylidenebis(7-bromo-3-hydroxy-2-naphthoic acid) may be prepared directly from 7-bromo-3-hydroxy-2-naphthoic acid and benzaldehyde in acetic acid in the presence of hydrochloric acid according to the procedure given under Example 2 for the preparation of 4,4'-methylenebis(7-bromo-3-hydroxy-2-naphthoic acid).

Utilizing the procedures described in Examples 1 through 6 herein, the following related compounds can be prepared starting from benzaldehyde and the appropriate 7-bromo-3-hydroxy-2-naphthoic acid derivative:

7-bromo-3,1'-dihydroxy-4,4'-benzylidenedi-2-naphthoic acid 7-bromo-3,6'-dihydroxy-4,5'-benzylidenedi-2-naphthoic acid 4,4'-benzylidenebis(7,8-dibromo-3-hydroxy-2-naphthoic acid); M.P. >330° C.

7,7',8-tribromo-4,4'-benzylidenebis(3-hydroxy-2-naphthoic acid); M.P. >330° C.

7,8-dibromo-3,1'-dihydroxy-4,4'-benzylidenedi-2-naphthoic acid; M.P. >300° C.

7-bromo-4,4'-benzylidenebis(3-hydroxy-2-naphthoic acid).

*Example 7*

A mixture containing 5.0 g. of 4,4'-methylene-bis(7-bromo-3-hydroxy-2-naphthoic acid) in 100 ml. of water is made slightly basic by the addition of a 10% aqueous solution of sodium hydroxide. The resulting solution is concentrated by evaporation under reduced pressure, and the precipitated disodium salt of 4,4'-methylenebis(7-bromo-3-hydroxy-2-naphthoic acid) is isolated by filtration and dried.

In like manner, the dipotassium salt of 4,4'-methylenebis(7-bromo-3-hydroxy-2-naphthoic acid) is obtained by treating the acid in water with a slight excess of potassium carbonate, concentrating the resulting solution by evaporation under reduced pressure, and isolating the precipitated salt.

We claim:

1. A member of the class consisting of 7-bromo-3-hydroxy-2-naphthoic acids of the formula

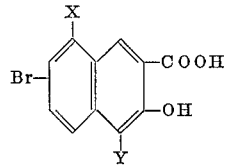

and alkali metal salts thereof, where X is a member of the class consisting of a hydrogen atom and a bromine atom and Y is chosen from the class consisting of a 4'-(7'-bromo-3'-hydroxy-2'-naphthoic acid), 4'-(7',8'-dibromo- 3'-hydroxy-2'-naphthoic acid), 4'-methylene(3'-hydroxy-2'-naphthoic acid), 4'-methylene(1'-hydroxy-2'-naphthoic acid), 5'-methylene(6'-hydroxy-2'-naphthoic acid), 4'-methylene(7' - bromo - 3' - hydroxy - 2' - naphthoic acid), 4' - methylene(7',8' - dibromo - 3' - hydroxy - 2' - naphthoic acid), 4'-benzylidene(3'-hydroxy-2'-naphthoic acid), 4'-benzylidene(1'-hydroxy-2'-naphthoic acid), 5'-benzylidene(6'-hydroxy-2'-naphthoic acid), 4'-benzylidene(7'-bromo-3'-hydroxy-2'-naphthoic acid), 4'-benzylidene(7',8'-dibromo-3'-hydroxy-2'-naphthoic acid), and a 3-carboxy-4'-hydroxybenzyl radical.

2. 6,6' - dibromo - 2,2' - dihydroxy - (1,1' - binaphthalene)-3,3'-dicarboxylic acid.

3. 4,4' - methylenebis(7 - bromo - 3 - hydroxy - 2 - naphthoic acid).

4. 4,4' - methylenebis(7,8 - dibromo - 3 - hydroxy - 2 - naphthoic acid).

5. 7,7',8 - tribromo - 4,4' - methylenebis(3 - hydroxy-2-naphthoic acid).

6. 4,4' - benzylidenebis(7 - bromo - 3 - hydroxy - 2 - naphthoic acid).

References Cited by the Examiner

Brass et al.: Berichte, vol. 65 (1932), p. 1654–60.

Galinowski et al.: Przemsyl Chemiczny, vol. II (1955), pp. 140–1.

Launow, L.: Annales Pharmaceutiques Francaises, book 5 (1947), pp. 599–605.

LORRAINE A. WEINBERGER, *Primary Examiner.*